United States Patent [19]
Herbert et al.

[11] Patent Number: 5,127,885
[45] Date of Patent: Jul. 7, 1992

[54] ENDLESS METAL BELT WITH STRENGTHENED EDGES

[75] Inventors: William G. Herbert; Mark S. Thomas, both of Williamson, N.Y.

[73] Assignee: Xerox Corporation, Stamford, Conn.

[21] Appl. No.: 633,027

[22] Filed: Dec. 24, 1990

[51] Int. Cl.⁵ .................................................. F16G 5/00
[52] U.S. Cl. ................................... 474/260; 474/270; 474/272; 148/DIG. 161; 29/122
[58] Field of Search ............... 474/265, 237, 242, 260, 474/265, 270, 272; 29/122, DIG. 24, DIG. 32; 148/DIG. 161; 22/342.94, 342.1

[56] References Cited

U.S. PATENT DOCUMENTS

| | | | |
|---|---|---|---|
| 3,074,828 | 1/1963 | Griffin et al. | 72/342.94 X |
| 3,323,342 | 6/1967 | Baker | 72/342.1 X |
| 3,557,866 | 1/1971 | Barrow et al. | 164/158 |
| 3,604,283 | 9/1971 | Van Doorne | 74/233 X |
| 3,799,859 | 3/1974 | Wallin | 204/216 |
| 3,844,906 | 11/1974 | Bailey et al. | 204/9 |
| 3,958,439 | 5/1976 | Kawaguchi et al. | 72/128 X |
| 3,959,109 | 5/1976 | Hambling et al. | 204/212 |
| 3,970,527 | 7/1976 | Brown | 204/9 |
| 4,067,782 | 1/1978 | Bailey et al. | 204/25 |
| 4,108,737 | 8/1978 | Ehrhardt et al. | 204/13 |
| 4,150,711 | 4/1979 | Hazelett et al. | 164/432 X |
| 4,501,646 | 2/1985 | Herbert | 204/4 |
| 4,530,739 | 7/1985 | Hanak et al. | 204/4 |
| 4,579,549 | 4/1986 | Okawa | 474/242 |
| 4,649,983 | 3/1987 | Laxmanan et al. | 164/432 X |
| 4,650,442 | 3/1987 | Parsons | 474/29 |
| 4,661,089 | 4/1987 | Cuypers | 474/242 |
| 4,664,758 | 5/1987 | Grey | 204/3 |
| 4,671,341 | 6/1987 | Wood | 164/432 |
| 4,787,961 | 11/1988 | Rush | 204/9 |
| 4,902,386 | 2/1990 | Herbert et al. | 204/9 |
| 4,921,037 | 5/1990 | Bergeron et al. | 164/481 X |

FOREIGN PATENT DOCUMENTS 3534796 4/1987 Fed. Rep. of Germany ..... 72/342.1

OTHER PUBLICATIONS

Keeton, C. R., *Metals Handbook*, 9th Edition, "Ring Rolling", pp. 108-127.

*Primary Examiner*—Ramon S. Britts
*Assistant Examiner*—Roger J. Schoeppel
*Attorney, Agent, or Firm*—Oliff & Berridge

[57] ABSTRACT

Ductility of belt material is increased at least at one edge of an endless metal belt, thus reducing the likelihood of premature failure of the belt. The inner region of the belt maintains the inherent strength of the metal. The endless metal belt so formed is particularly useful as a driving member for a continuously-variable transmission.

26 Claims, 2 Drawing Sheets

ENDLESS METAL BELT WITH STRENGTHENED EDGES

BACKGROUND OF THE INVENTION

This invention relates in general to endless metal belts, and in particular, to a process for strengthening the edges of endless metal belts.

Endless metal belts have been disclosed in the prior art for many purposes, including their use as drive members for continuously variable transmissions. When used in this manner, an endless metal belt must have certain properties and characteristics to operate efficiently.

The endless metal belt must be made of a material which is strong, exhibiting both a high fatigue strength which reduces the likelihood of failure from fatigue fracturing, and high compressive strength and tensile strength, which enable the belt to withstand the continuously varying demands imposed by the bending stresses inherent in the operation of the dual pulley system of the continuously-variable transmission. The belt material must be able to stretch without yielding and be flexible. It must be durable with a high wear resistance, because replacement requires the machine to be non-functional and is costly. The belt material must have high processability and be capable of being fashioned into a thin belt which can be manufactured to a high precision of circumferential length. In the event of multiple metal belts forming a continuously-variable transmission belt assembly, this high precision of circumferential length for each successive belt is especially critical to the formation of equal gaps between successive belts of the assembly. The multilayered belt assembly must have exacting tolerances with respect to the distance between the belts, as well as minimal friction between the belts. Each belt of a belt assembly must be capable of equal load sharing.

U.S. Pat. No. 3,604,283 to Van Doorne discloses a flexible endless member consisting of one or more layers of steel belts for use with a continuously-variable transmission, containing a driving mechanism which comprises a driving pulley with a V-shaped circumferential groove and a driven pulley with a V-shaped circumferential groove. The flexible endless member, which has chamfered (beveled) flanks, interconnects and spans the pulleys. The diameters of the pulleys automatically and steplessly can be varied with regard to each other in such a way that different transmission ratios can be obtained.

U.S. Pat. No. 4,661,089 to Cuypers discloses an endless metal belt for use with a continuously-variable transmission and a method for strengthening the belt to be less susceptible to the bending and tensile stresses to which a belt is subjected during the operation of a continuously-variable transmission. These stresses are often the source of hairline cracks which may result in early belt breakage. This method involves plastic deformation of the belt's edge zones by shot peening or rolling, thereby incorporating permanent compressive stresses in the belt edge zones.

Endless metal belts used for belt drives can be formed by several methods. One manufacturing method employs a "ring rolling method" similar to that described in *Metals Handbook*, 9th ed., wherein a metal, cylindrical tube is cut to a specified length and then an innermost layer is formed on the ring-rolling machine, making the ring wall thinner and the circumferential length longer. Subsequently, a number of additional layers, wherein the radius of each layer is slightly larger than that of the previously formed layer, may be similarly formed. The layers are then subjected to solution annealing in a vacuum furnace on a stainless steel cylinder, wherein the layers are rotated around two pulleys with tension in order to adjust the gap between the layers. After the dimensional correction, the layered belt is processed by precipitation-hardening (e.g., 490° C. for 3 hours) and surface-nitriding. Finally, in order to improve lubrication ability between belts, surface profiling is performed.

U.S. Pat. No. 4,787,961 to Rush discloses a method of preparing a multilayered endless metal belt, wherein a tensile band set is formed from a plurality of separate looped endless bands in a nested and superimposed relation. The patent states that the bands are free to move relative to each other, even though the spacing between the adjacent bands is relatively small. At least one band may be formed by an electroforming process.

There is a need for a drive belt that is strong enough to carry a load which can also withstand stress, last longer and not be subject to premature failure.

SUMMARY OF THE INVENTION

It is an object of the invention to provide an endless metal belt wherein the edges have been strengthened to reduce the likelihood of premature failure.

It is a further object of the invention to provide an endless metal belt with a strong center body and strengthened edges to avoid premature failure of the belt.

It is yet a further object of the invention to provide a process for forming an endless metal belt with a strong center body and strengthened edges to avoid premature failure of the belt.

This invention provides an endless metal belt, and a process for forming such an endless metal belt, wherein the edge regions of the endless metal belt have been strengthened by increasing their ductility relative to the center region of the belt. This may be accomplished by the application of heat to the edge regions, in order to provide an increase in the ductility of those regions. This application of heat can be provided by a number of sources.

BRIEF DESCRIPTION OF THE DRAWINGS

FIG. 3b is an orthogonal view of FIG. 3a.

DETAILED DESCRIPTION OF PREFERRED EMBODIMENTS

Figure 1:
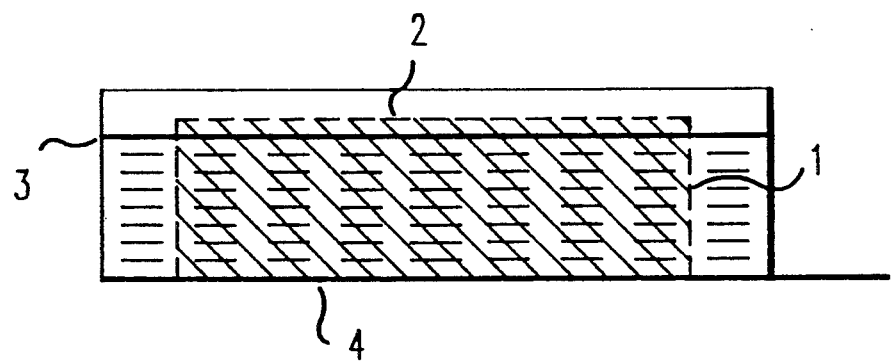
FIG. 1 illustrates the annealing the edge region of an endless metal belt in an oven.

This invention provides an endless metal belt with strengthened edges to reduce the likelihood of premature failure, and a process for preparing an endless metal belt with edges which have been strengthened.

When endless metal belts are used with a continuously-variable transmission, they are exposed to the many stresses inherent in a continuously-variable transmission; such tensile and compressive stresses are described in U.S. Pat. No. 4,661,089. It is a problem inherent in the structure of the endless metal belt and its use during the operation of the continuously variable transmission that the edge of the belt is subject to a great deal of stress. Any defect or perturbation in the edge of a metal belt which operates under stress will act as a stress enhancer and may ultimately result in premature failure. It is very important that the belts used in this manner are free from perturbations.

An endless metal belt of the invention is prepare from a metal which exhibits the properties of strength and ductility. Metals exhibiting these characteristics may include, for example, brass, copper, electroformed nickel, stainless steel and iron. Preferred metals include brass and an alloy of carbon and sulfur-free nickel, such as that formed by the electroforming process described in U.S. Pat. No. 3,844,906 in the absence of saccharin and methyl-benzyl sulfamide (MBSA).

Ductile materials are in general unable to carry much load. Therefore, it is desirable that the metal used for the endless metal belt of the invention be a strong material that can be made ductile by, for example, annealing. With such a material, it is possible to design a belt which will have a strong center region with at least one edge region being ductile, and thus less likely to undergo premature failure. This can be accomplished by annealing at least one edge of the endless metal belt.

Annealing is a process wherein a solid material is held at an elevated temperature for a specified length of time in order that any metastable condition within the solid material may go into thermodynamic equilibrium. This may then result in a desired change within the annealed object either to give the object a new property or to overcome a property which was engendered in the object from prior processing. For example, annealing may result in a recrystallization of the metal structure.

Crystals of metals that have been plastically deformed have more energy than unstrained crystals because they are loaded with dislocations and point imperfections. Given a chance, the atoms of the crystal will move to form a more perfect, unstrained array. This can occur when the crystals are subjected to elevated temperatures, as in the process of annealing. The greater thermal vibrations of the lattice at high temperatures permit a reordering of the atoms into less distorted grains. With metals, annealing may be used to remove residual stresses in the metals, as well as to soften the metal.

Thus, it would be desirable to treat the endless metal belt, formed by any method, in such a manner that at least one of the edges of the endless metal belt is annealed, without losing the strength properties of the belt. Annealing of a metal belt is performed under conditions wherein the temperature of a selected portion (or portions) of the metal belt is raised to a temperature and for a period of time specific to the metal comprising the belt which will soften the metal. In the preferred embodiment of an electroformed nickel belt, annealing of the nickel belt may be accomplished by heating the edge of the nickel belt to 400° F. for 5 minutes, to 800° F. for 5 seconds, or to 2500° F. for $5 \times 10^{-3}$ second (as in the case of laser heating).

The presence of sulfur may, under some conditions, particularly as an atomic dispersion, cause certain metals such as nickel to become brittle with the application of heat, because of the tendency of sulfur to migrate to the grain boundaries. In the event that the metal forming the belt is electroformed, therefore, it is preferable to form the belt in an electroforming bath which does not contain such sulfur-containing components as saccharin or MBSA. However, sulfur aggregates such as are found in sulfur depolarized nickel do not cause such embrittlement problems. Other impurities which are known to cause embrittlement upon heating should also be avoided.

Several methods can be used to anneal the edges of the metal belt, according to the invention.

One method is to submerge a portion of the belt in a liquid, leaving the edge of the belt exposed. Heat is then applied to this exposed edge by an apparatus such as a radiant heater or blow torch. Only a small amount of the edge of the metal belt should be annealed. Preferably, only the smallest amount needed to exceed the granular structure of the belt's edge, which is generally less than about 1.6 mm, is exposed for the annealing process.

The belt is then permitted to cool slowly in a known manner, for example for about 30 seconds in air, in order that the annealing process may be completed. If it is desired that the opposite edge of the belt also be annealed, this can be done in the same manner after the first annealed edge has been processed completely.

The liquid used for this method should have high specific heat, and be of sufficient capacity in terms of volume to keep the temperature of the portion of the belt immersed in the liquid from approaching the temperature of the portion of the belt being annealed. Liquids useful for this purpose include water, polyethylene glycol, paraffin, oils and waxes with high boiling points. Water is a preferred liquid for this embodiment.

A second method is to contact the center region of the metal belt (that region which is not desired to be annealed) with a solid material which will act as a heat sink, i.e., will draw heat away from the metal belt so that the center region of the metal belt will not reach an annealing temperature. Heat is then applied as above to the exposed edge or edges, preferably to the smallest depth possible which exceeds the granular structure of the belt's edge, generally less than about 0.8 mm, for the required period of time. The annealed edge or edges are then permitted to cool down slowly for about 3 seconds in air, optionally after removing the belt from the heat sink. The heat sink employed should be constructed of a material with high heat conductance that will absorb the heat being applied to the belt and draw it away from the center region of the belt. Such materials include cast iron, aluminum, copper, silver, and other materials commonly known for good heat conductance.

An advantage to both of the aforementioned methods of annealing is that the annealing process can be employed on a previously polished edge. This is an advantage because the edge which is initially formed on an endless metal belt is not generally in a form which can be immediately used with a continuously-variable transmission. Some finishing, generally including some polishing by conventional grinding methods or electrochemical grinding, is often required to remove rough edges which tend to concentrate stress. Annealing by the above methods can be performed after this prior finishing step is completed. A further advantage of the use of the solid heat sink is that both edges can be annealed at the same time. While this could also be achieved with a liquid, it would require more complex apparatus.

A third method is to use a laser to cut the belt to the desired width. The laser must have sufficient power to cut through the belt material. A laser suitable for use with this process is provided by Webster Tool and Die Co. of Webster, New York, and is constructed to the following specifications:
Laser-Dyne 780 Center
Laser-Coherent Brand ($CO_2$)
800 watts max/using 350 watts
40-50 inches/min
0.001-0.002 curf In the process of laser cutting, the edges are heated past the melting point of the material for a period of time sufficient to cut completely through the material. It has been found that this amount of exposure to heat is sufficient to anneal the edges. In the preferred embodiment of a nickel belt, this temperature is greater than 1453° C. An advantage of this method is that it minimizes annealing of the bulk of the belt. That portion of the belt which is exposed to the heat is much smaller than the region of the belt so exposed in the prior two methods. Generally, only about 0.2 to about 0.4 mm. of the belt's edge is annealed. Thus, of the three methods described, this method provides for a greatest amount of the belt region to remain strong, which also maximizes the load carrying capacity of the inner region of the belt. This method, however, does not permit the edge of the belt being cut by the laser to be polished or otherwise finished prior to annealing.

A preferred method for preparing belts of this invention is by an electroforming process similar to those disclosed in U.S. Pat. No. 3,844,906 to Bailey and U.S. Pat. No. 4,501,646 to Herbert. This process provides an electroforming bath formulated to produce a thin, seamless metal belt by electrolytically depositing metal from the bath onto a support mandrel. Electroformed belts may be formed individually or in a superimposed manner, to form a "nested" belt assembly. When produced as an assembly, each belt within the assembly is separated from the adjacent belt or belts by a gap which contains a lubricant. An advantage of the electroforming process is that it enables very thin belts to be formed in a manner that controls the gap size optimally.

The methods of strengthening the edges of the belts disclosed herein may also be applied to belt assemblies. Radiant heating from the edge is preferred in this embodiment.

The optimal thickness of the belt material is identified by determining the belt thickness associated with the lowest total stress (bending stress plus direct stress) on the belt in a given dual pulley system. The total stress is equal to the sum of the bending stress plus the direct stress. Bending stress is equal to $EC/\rho$, wherein E is the elasticity of the belt material, C is one half the belt thickness, and $\rho$ is the radius of curvature of the smallest pulley. Direct stress is equal to $F_1/A$, wherein $F_1$ is the tight side force between the pulleys and A is the cross-sectional area of the belt. The total stress is calculated for a series of belts of different thicknesses, and the belts are formed with the thickness which has the lowest total stress value.

The optimal gap size between belts in a nested belt assembly is the minimum gap necessary to provide adequate lubrication, since a smaller gap allows the lubricant to carry more torque than does a larger gap. This size can readily be determined by those of skill in the art. The optimal lubricant is identified by determining the lubricant with the highest torque-carrying ability within its optimal gap. The torque carrying ability of a given lubricant is equal to $$T = 4\mu\pi^2 Nr^3 l/M_r$$

wherein $\mu$ is the absolute viscosity of the lubricant, N is the rotational velocity of the smallest pulley, r is the radius of the smallest pulley, l is the width of the belt and Mr is the radial clearance (gap) between adjacent belts. The torque carrying ability is calculated for a series of different lubricants and a lubricant is selected which provides the highest value. The methods of determining optimal belt thickness and lubricant are disclosed in detail in U.S. Pat. No. 5,049,242 entitled "Endless Metal Belt Assembly With Controlled Parameters," which is hereby incorporated by reference.

The gap which is formed between adjacent layers may be controlled by selecting those parameters which produce a compressive stress which will produce the desired gap, such as electroforming bath temperature, current density, agitation and stress reducer concentration, as disclosed in detail in copending U.S. patent application Ser. No. 07/632,518 filed simultaneously herewith and entitled "Electroforming Process for Endless Metal Belt Assembly with Belts that are Increasingly Compressively Stressed", which is hereby incorporated by reference.

When belt assemblies are composed of a plurality of independently movable belts electroformed one atop another, the belts must be electroformed so that they do not adhere to the previously formed belt on the mandrel. This may be accomplished by forming a passive layer, preferably an oxide film, on the outer surface of each belt before forming the next belt, as disclosed in detail in U.S. Pat. No. 5,049,243 entitled "Electroforming Process for Multi-layer Endless Metal Belt Assembly," which is hereby incorporated by reference.

The belts may be further improved by electroforming the belts so that adjacent and opposing belt surfaces are constructed of materials of different hardness, such as nickel and chromium, as disclosed in detail in copending U.S. patent application Ser. No. 07/633,025 filed simultaneously herewith and entitled "Endless Metal Belt Assembly With Hardened Belt Surfaces", which is hereby incorporated by reference. The electroforming process also permits the belts to be formed with surfaces designed to trap and circulate lubricant with protuberances, indentations, and pits formed by adjusting parameters of the electroforming bath such as the mandrel surface roughness, metal ion concentration, rate of current application, current density and operating temperature of the electrolyte. The protuberances thus formed, for example, may be up to about 95% of the gap size. Electroformed belts with such surfaces are disclosed in detail in copending U.S. patent application Ser. No. 07/633,604 filed simultaneously herewith and entitled "Endless Metal Belt Assembly with Minimized Contact Friction," which is hereby incorporated by reference.

Annealed belts formed by the methods described above generally show a decrease in hardness and an increase in ductility in the annealed regions. The hardness of the belts can be expressed in terms of the Mohs hardness scale. The ductility of the belts can be expressed in terms of percent elongation of a 2 inch "pull." In this technique, a segment of a strip of the metal belt material approximately 2.5 inches long is cut to be less wide than the remainder of the strip; a 2 inch portion is marked on this narrower segment, and the strip is then stretched by a force applied at one end until the strip breaks. The marked portion is measured after breakage, and the difference in length between the 2 inch unstretched segment and the segment after stretching is expressed as a % elongation. It is preferable for the ductility at the edge region of the belt to be at least twice the ductility of the center region, and to have at least ≧ 0.01% elongation. It is more preferred that the elongation be ≧ 5%, and most preferred that it be ≧ 10%.

EXAMPLES

This invention will further be illustrated in the following, non-limiting examples, it being understood that these examples are intended to be illustrative only and that the invention is not intended to be limited to the materials, conditions, process parameters and the like recited therein. The following examples relate to electroformed belts, but the invention is not limited thereto.

| OPERATING CONDITIONS FOR ALL EXAMPLES | |
|---|---|
| | Most Preferred |
| Major Electrolyte Constituents: | |
| Nickel sulfamate - as $Ni^{+2}$, 8-12 oz/gal (60-90 g/L) | 11.5 oz/gal |
| Chloride - as $NiCl_2.6H_2O$, 1.0-7 oz/gal (7.5-52.5 g/L) | 2.5 oz/gal |
| Boric Acid - 5.0-5.4 oz/gal (37.5-40.5 g/L) | 5 oz/gal |
| pH - 3.85-4.05 at 23° C. | 3.95 |
| Surface tension - at 136° F., 32-37 d/cm using sodium lauryl sulfate (about 0.00525 g/L) | 35 d/cm. |
| Saccharin - 0-2 mg/L, as sodium benzosulfimide dihydrate | 0 mg/L |
| Leveler - 0-70 mg/L as 2-butyne-1,4-diol | As Required to 70 mg/L |
| Impurities | |
| Aluminum - 0-20 mg/L | 0 mg/L |
| Ammonia - 0-400 mg/L | 0 mg/L |
| Arsenic - 0-10 mg/L | 0 mg/L |
| Azodisulfonate - 0-50 mg/L | 0 mg/L |
| Cadmium - 0-10 mg/L | 0 mg/L |
| Calcium - 0-20 mg/L | 0 mg/L |
| Hexavalent chromium - 4 mg/L maximum | 0 mg/L |
| Copper - 0-25 mg/L | 0 mg/L |
| Iron - 0-250 mg/L | 0 mg/L |
| Lead - 0-8 mg/L | 0 mg/L |
| MBSA - (2-methyl benzene sulfonamide) - 0-20 mg/L | 0 mg/L |
| Nitrate - 0-10 mg/L | 0 mg/L |
| Organics - Depends on the type, however, all known types need to be minimized | 0 mg/L |
| Phosphates - 0-10 mg/L | 0 mg/L |
| Silicates - 0-10 mg/L | 0 mg/L |
| Sodium - 0-0.5 g/L | 0 mg/L |
| Sulfate - 0-2.5 g/L | 0 mg/L |
| Zinc - 0-5 mg/L | 0 mg/L |

| Operating Parameters | |
|---|---|
| Agitation Rate - 4-6 Linear ft/sec solution flow over the cathode surface | 6 Linear ft/sec |
| Cathode (Mandrel) - Current Density, 100-400 ASF (amps per square foot) | 250 ASF |
| Ramp Rise - 0 to operating amps in 0 to 5 min ± 2 sec | 1 min |
| Plating Temperature at Equilibrium - 130-155° F. | 140° F. |
| Anode - electrolytic, depolarized, or carbonyl nickel | carbonyl nickel |
| Anode to Cathode Ratio - 1:1 minimum | 2:1 |
| Mandrel Core - aluminum, zinc, lead, cadmium, (USE THERMAL COEFFICIENT OF EXPANSION TO PART) or stainless steel (USE HYSTERESIS TO PART) | zinc |

Saccharin and MBSA must be kept at a minimum in this example, and it is best to keep the other impurities at a minimum as well. Azodisulfonate can be tolerated at fairly high levels, but will cause sulfate and ammonia to increase which is problematical over the long run, but gives a smooth deposit. Butynediol can be used as a leveler to facilitate smooth deposits as can ramp rise, nickel concentration, and current density. The range of internal stress available which will allow parting is small but several belts can be made especially one on another, by using a mandrel with a zinc core.

| Mandrel | |
|---|---|
| Metal | Coeff. of linear expansion $(\times 10^6)(°C.)^{-1}$ |
| Aluminum | 25 |
| Cadmium | 30 |
| Lead | 29 |
| Nickel | 13 |
| Tin | 20 |
| Zinc | 35 |

Zinc is preferable because it has a thermal coefficient of linear expansion which is 1.4 times that of aluminum and can be chromium plated so that a good parting surface can be obtained. However, high levels of zinc, lead, aluminum or cadmium in the bath cannot be tolerated. All non-plated mandrel surfaces must be protected from the electrolyte at all times. This is achieved by masking these areas with a non-conductor like, for example, PVC (polyvinyl chloride) or wax.

EXAMPLE 1

400° F. and 800° F. Annealed

Oil Bath in Oven

After a 0.00175 inch thick belt is electroformed, it is mechanically cut into 10 one inch wide continuous strips and one eight inch wide continuous strip. Four of the one inch wide strips are put into an oil bath which is at room temperature (70° F.)) such that one sixteenth of an inch of one of the edges of each belt extends above the surface of the oil. The belts and the oil bath are then put into an oven, which has been preheated to 400° F. for ten minutes. FIG. 1 illustrates an endless metal belt 1 immersed in an oil bath with the edge of the belt 2 to be annealed extending above the surface of the oil 3 and resting on the oven shelf 4. The belts and the oil bath are then removed from the oven. The temperature of the oil bath is found to have increased to 75° F. Two belts are removed from the oil bath, labeled as 1-10-400 and 2-10-400, and saved for flex testing. After the oil bath returns to room temperature, the remaining belts are turned over so that the other edge extends beyond the surface of the oil. The oil bath with the two remaining belts is returned to the oven as before. After 10 minutes, the belts are removed from the oven and labeled 3-10-400 and 4-10-400. The oil bath is again found to be 75° F.

Two of the six remaining one inch wide strips are labeled 1-0-0 and 2-0-0 respectively and set aside for flex testing.

The four remaining one inch wide strips are put into an oil bath which is at room temperature (70° F.) such that one sixteenth of an inch of one of the edges of each belt extends above the surface of the oil. The belt and the oil bath are then put into an oven, which has been preheated to 800° F., for 20 minutes. The belts and the oil bath are then removed from the oven. The temperature of the oil bath is found to have increased to 108° F. Two belts are removed from the oil bath, labeled as 1-20-800 and 2-20-800, and saved for flex testing. After the oil bath returns to room temperature, the remaining belts are turned over so that the other edge extends beyond the surface of the oil. The oil bath with the two remaining belts is returned to the oven as before. After 20 minutes, the belts are removed from the oven and labeled 3-20-800 and 4-20-800. The oil bath is again found to be 108° F.

These ten belts are then flex tested at room temperature in a device with two 0.5 inch diameter rollers. Tension is maintained at 40,000 psi during the test. The speed is kept at 1000 rpm. The belts are inspected every 10,000 revolutions for cracks.

| BELT NO. | RESULTS REVs to edge cracks noted | REVs to breaking | NOTE |
|---|---|---|---|
| 1-0-0 & 2-0-0 | 110,000 | 240,000 | Crack initiation at both edges |
| 1-10-400 | 120,000 | 230,000 | Crack started at one edge only |
| 2-10-400 | 100,000 | 240,000 | Crack started at one edge only |
| 3-10-400 | 220,000 | 500,000 | Crack initiation at both edges |
| 4-10-400 | 230,000 | 290,000 | Crack initiation at both edges |
| 1-20-800 | 120,000 | 230,000 | Crack started at one edge only |
| 2-20-800 | 120,000 | 240,000 | Crack started at one edge only |
| 3-20-800 | 330,000 | 750,000 | Crack initiation at both edges |
| 4-20-800 | 340,000 | 740,000 | Crack initiation at both edges |

EXAMPLE 2

Laser Cut Annealed

Figure 2:
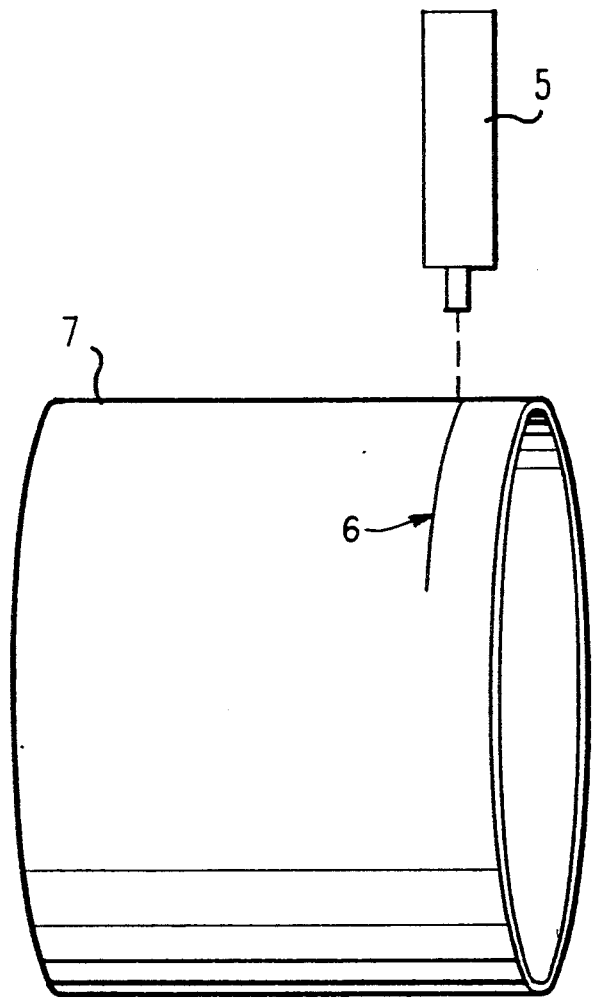
FIG. 2 illustrates annealing an endless metal belt with a laser.

After a 0.00175 inch thick belt is electroformed, it is laser cut into 18 one inch wide continuous strips. Each strip is labeled. The first strip is labeled 2-1, the next 2—2, etc. through 2-18. The 8 inch wide strip left over from example 1 is also laser cut into one inch wide strips. The resulting eight strips are number 1—1 through 1-8. Strip 1—1 and strip 1-8 each have one laser cut edge and one mechanically cut edge. FIG. 2 illustrates the laser 5 cutting a one inch wide continuous strip 6 from a 0.00175 inch thick electroform belt 7.

These 26 belts are then flex tested at room temperature in a device with two 0.5 inch diameter rollers. Tension is maintained at 40,000 psi during the test. The speed is kept at 1000 rpm. The belts are inspected every 10,000 revolutions for cracks.

| BELT NO. | RESULTS REVs to edge cracks noted | REVs to breaking | NOTE |
|---|---|---|---|
| 1-1 | 110,000 | 230,000 | Crack initiation mechanical cut edge |
| 1-2 | 430,000 | 1,020,000 | Crack initiation at both edges |
| 1-3 | 440,000 | 980,000 | Crack initiation at both edges |
| 1-4 | 430,000 | 990,000 | Crack initiation at both edges |
| 1-5 | 420,000 | 1,020,000 | Crack initiation at both edges |
| 1-6 | 420,000 | 1,010,000 | Crack initiation at both edges |
| 1-7 | 440,000 | 1,010,000 | Crack initiation at both edges |
| 1-8 | 120,000 | 240,000 | Crack initiation mechanical cut edge |
| 2-1 | 430,000 | 990,000 | Crack initiation at both edges |
| 2-2 | 440,000 | 1,010,000 | Crack initiation at both edges |
| 2-3 | 440,000 | 980,000 | Crack initiation at both edges |
| 2-4 | 420,000 | 1,010,000 | Crack initiation at both edges |
| 2-5 | 410,000 | 1,020,000 | Crack initiation at both edges |
| 2-6 | 440,000 | 990,000 | Crack initiation at both edges |
| 2-7 | 430,000 | 990,000 | Crack initiation at both edges |
| 2-8 | 430,000 | 980,000 | Crack initiation at both edges |
| 2-9 | 420,000 | 1,020,000 | Crack initiation at both edges |
| 2-10 | 440,000 | 1,010,000 | Crack initiation at both edges |
| 2-11 | 440,000 | 1,020,000 | Crack initiation at both edges |
| 2-12 | 420,000 | 1,010,000 | Crack initiation at both edges |
| 2-13 | 420,000 | 1,010,000 | Crack initiation at both edges |
| 2-14 | 440,000 | 980,000 | Crack initiation at both edges |
| 2-15 | 440,000 | 990,000 | Crack initiation at both edges |
| 2-16 | 440,000 | 1,020,000 | Crack initiation at both edges |
| 2-17 | 430,000 | 990,000 | Crack initiation at both edges |
| 2-18 | 420,000 | 1,020,000 | Crack initiation at both edges |

ROLL FLAME ANNEALED

EXAMPLE 3

Figure 3A:
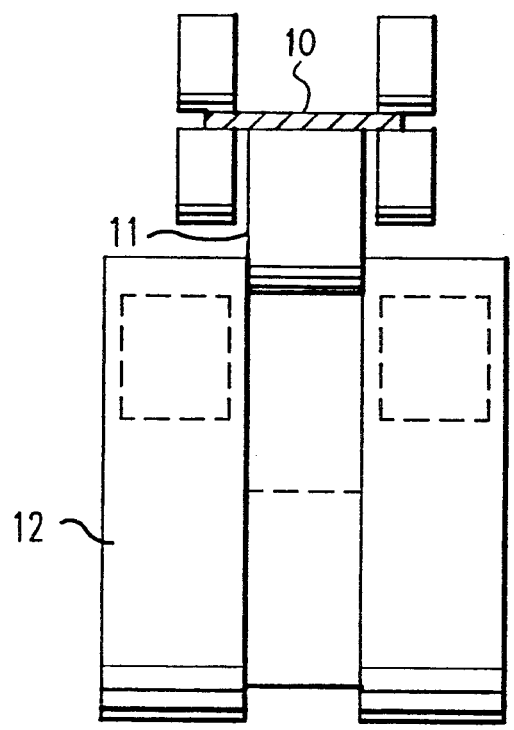
FIG. 3a illustrates an endless metal belt with its center region in contact with a heat sink roller.
Figure 3B:
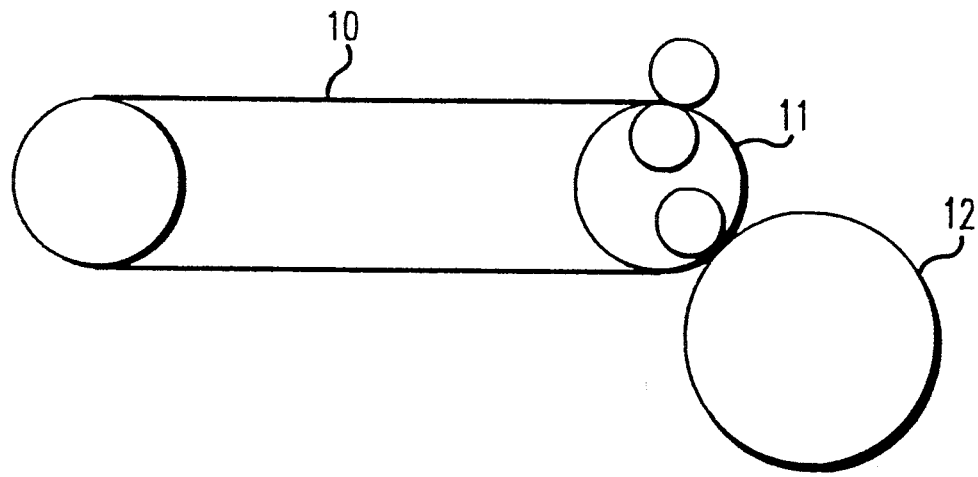

After a 0.00175 inch thick belt is electroformed, it is mechanically cut into 18 one inch wide continuous strips. Each strip is labeled. The first strip is labeled 3-1, the next 3-2, etc. through 3-18. The strips 10, as illustrated in FIGS. 3a and 3b, are then placed into a device comprising one two inch drive roller 11 and two massive (5 lbs. each) copper rollers 12 which have opposing raised diameters which are seven eighths of an inch wide and four inches in diameter. The rest of each of these massive rollers is 3.9 inches in diameter. The belt is made to track between the two opposing rollers and over the drive roller. Two propane burners are provided which are affixed with tips which enable the flame to be focused to a fine point. The burners are positioned such that when lit, the tip of the resulting flame just contacts the edge of the belt.

The belt is mounted in this device and made to rotate at 60 rpm. The burners are then lit and left to simultaneously heat the edges of the belt for the period of time that it takes the belt to make ten full revolutions (10 seconds). The temperatures of the massive rollers and the drive roller are checked immediately following the burn and found to be at one half to 1° F. above room temperature. The device is left to stand between hours until all rollers return to room temperature.

Eight of these belts are then flex tested at room temperature in a device with two 0.5 inch dimeter rollers. Tension is maintained at 40,000 psi during the test. The speed is kept at 1000 rpm. The belts are inspected every 10,000 revolutions for cracks.

| BELT NO. | RESULT | | NOTE |
|---|---|---|---|
| | REVs to edge cracks noted | REVs to breaking | |
| 3-1 | 310,000 | 730,000 | Crack initiation at both edges |
| 3-2 | 330,000 | 720,000 | Crack initiation at both edges |
| 3-3 | 340,000 | 750,000 | Crack initiation at both edges |
| 3-8 | 330,000 | 750,000 | Crack initiation at both edges |
| 3-11 | 320,000 | 720,000 | Crack initiation at both edges |
| 3-12 | 320,000 | 710,000 | Crack initiation at both edges |
| 3-15 | 340,000 | 710,000 | Crack initiation at both edges |
| 3-18 | 320,000 | 740,000 | Crack initiation at both edges |

Other modifications of the present invention may occur to those skilled in the art subsequent to a review of the present application, and these modifications, including equivalents thereof, are intended to be included within the scope of the present invention.

What is claimed is:

1. An endless metal belt comprising a center region between two edge regions, wherein a ductility of at least one said edge region is greater than a ductility of said center region, wherein ductility is measurable as percent elongation of a two inch pull.

2. The endless metal belt of claim 1, wherein the ductility of both said edge regions is greater than the ductility of said center region.

3. The endless metal belt of claim 2, wherein said belt is an electroformed belt, and a width of each said edge region is the smallest amount necessary to exceed the width of a granular structure of said edge.

4. The endless metal belt of claim 2, wherein a width of each said edge region is less than about 1.6 mm.

5. The endless metal belt of claim 2, wherein a width of each said edge region is less than about 0.8 mm.

6. The endless metal belt of claim 2, wherein a width of each said edge region is between about 0.2 and about 0.4 mm.

7. The endless metal belt of claim 2, wherein the ductility of said edge regions as measured in percent elongation of a two inch pull is at least twice the ductility of said center region.

8. The endless metal belt of claim 2, wherein the metal is selected from the group consisting of nickel, brass, copper, stainless steel, and iron.

9. An endless metal belt of claim 2, which has been treated by
    applying heat to both edges of claim 2, which has been treated by
    applying heat to both edges of said belt to increase the ductility of said edge regions; and
    maintaining said center region at a temperature which retards any increase in ductility.

10. The endless metal belt of claim 9, wherein the heat has been applied to the edge of said belt by cutting the edge of said belt with a laser.

11. An endless metal belt assembly comprising at least two independently movable nested endless metal belts comprising a center region between two edge regions, wherein a ductility of said edge regions is greater than a ductility of said center region, wherein ductility is measurable as percent elongation of a two inch pull.

12. A process for treating an endless metal belt which has a center region between two edge regions, comprising treating at least one said edge region to increase a ductility of said edge region above a ductility of said center region, wherein ductility is measurable as percent elongation of a two inch pull.

13. The process of claim 12, wherein both said edge regions are treated to increase their ductility above said ductility of said center region.

14. The process of claim 13, wherein said belt is an electroformed belt, and a width of each said edge region is the smallest amount necessary to exceed the width of a granular structure of said edge.

15. The process of claim 13, wherein the ductility of said edge regions as measured in percent elongation of a two inch pull is increased to at least twice the ductility of said center region.

16. The process of claim 13, comprising applying heat to said edge regions to increase the ductility of said edge regions; and
    maintaining said center region at a temperature which retards any increase in ductility.

17. The process of claim 16, comprising:
    submerging a first said edge region and said center region in a liquid and leaving a second said edge region exposed;
    applying heat only to said exposed second edge region;
    allowing said second edge region to cool;
    submerging said second edge region and said center region in a liquid and leaving said first edge region exposed;
    applying heat only to said exposed first edge region; and
    allowing said first edge region to cool.

18. The process of claim 17, wherein the liquid is selected from the group consisting of oil, water, polyethylene glycol and paraffin.

19. The process of claim 17, wherein the liquid is an oil.

20. The process of claim 16, comprising contacting a heat sink to said center region and applying heat only to said edge regions.

21. The process of claim 20, wherein heat is applied simultaneously to both said edge regions.

22. The process of claim 20, wherein the heat sink is a solid body composed of a material selected from the group consisting of copper, aluminum, cast iron, steel and stainless steel.

23. The process of claim 16, wherein the heat is applied to said edge regions by means of a laser.

24. The process of claim 23, wherein the heat is applied to both said edge regions simultaneously.

25. The process of claim 23, wherein the heat is applied to said edge regions sequentially.

26. The process of claim 23, wherein the laser cuts the metal belt.

* * * * *